(12) United States Patent
Sykora et al.

(10) Patent No.: US 12,095,396 B2
(45) Date of Patent: Sep. 17, 2024

(54) REDUCED MOTOR MAGNETIC LOSSES VIA REDUCTION OF TEMPORAL HARMONICS BY CONTROL OF DC LINK VOLTAGE

(71) Applicant: Trane International Inc., Davidson, NC (US)

(72) Inventors: Benjamin Sykora, Stoddard, WI (US); Seth M. McGill, Brookings, SD (US)

(73) Assignee: TRANE INTERNATIONAL INC., Davidson, NC (US)

( * ) Notice: Subject to any disclaimer, the term of this patent is extended or adjusted under 35 U.S.C. 154(b) by 187 days.

(21) Appl. No.: 17/849,416

(22) Filed: Jun. 24, 2022

(65) Prior Publication Data

US 2023/0421087 A1 Dec. 28, 2023

(51) Int. Cl.
*H02P 27/08* (2006.01)
*H02M 5/458* (2006.01)
*H02P 23/14* (2006.01)

(52) U.S. Cl.
CPC ............ *H02P 27/08* (2013.01); *H02M 5/458* (2013.01); *H02P 23/14* (2013.01)

(58) Field of Classification Search
CPC .......... H02P 27/04; H02P 27/06; H02P 27/08; H02P 27/085; H02P 6/00; H02P 6/06; H02P 6/08; H02P 6/28; H02P 7/29; H02P 21/00; H02P 21/0021; H02P 21/0085; H02P 21/04; H02P 21/18; H02P 21/22; H02P 23/03; H02P 23/07; H02P 23/14; H02P 25/022; H02P 25/062; H02P 29/50; H02P 2201/03; H02P 2201/13; H02P 2207/05; H02P 2201/07; H02P 25/08; H02P 2201/09; H02P 1/46; H02P 2201/01; H02P 2207/01; H02P 6/16; H02M 5/4585; H02M 5/458; H02M 1/4216; H02M 1/4233; H02M 1/15; H02M 1/36; H02M 7/53871; H02M 1/123; H02M 1/0054; H02M 5/225; H02M 7/5395; H02M 7/5387; H02M 1/084; H02M 1/322; H02M 5/2932; H02M 1/14; H02M 1/0048;
(Continued)

(56) References Cited

U.S. PATENT DOCUMENTS 5,808,880 A 9/1998 Marvin
7,425,806 B2 9/2008 Schnetzka et al.
(Continued)

FOREIGN PATENT DOCUMENTS

EP 1 626 491 B1 6/2011
EP 3 214 719 B1 2/2017

*Primary Examiner* — Antony M Paul
(74) *Attorney, Agent, or Firm* — Womble Bond Dickinson (US) LLP (57) ABSTRACT

An apparatus and method for reducing motor magnetic losses via reduction of temporal harmonics by control of a direct current (DC) link voltage. In one embodiment, the apparatus includes an inverter for converting DC power into alternating current (AC) power for an electric motor. The apparatus also includes a voltage source, which may take form in a rectifier that is configured to provide the DC output voltage to the inverter via a DC link. The voltage source is configured to adjust a magnitude of the DC output voltage based on a rotational speed of the electric motor. The voltage source may also adjust the magnitude of the DC output voltage based on a power output of the inverter.

19 Claims, 8 Drawing Sheets

(58) Field of Classification Search
CPC ........ H02M 1/12; H02M 7/219; H02M 5/271; B60H 1/00428; H02K 11/04; H02K 11/33; H02K 17/02; H02K 41/03
See application file for complete search history.

(56) References Cited

U.S. PATENT DOCUMENTS

| | | |
|---|---|---|
| 7,640,767 B2 | 1/2010 | Schnetzka et al. |
| 9,024,559 B2 | 5/2015 | Adiga-Manoor et al. |
| 9,979,341 B2 | 5/2018 | Becerra et al. |
| 10,693,406 B2 | 6/2020 | Borisov et al. |
| 2001/0001227 A1* | 5/2001 | Notohara ............ H02M 5/4585 318/268 |
| 2009/0230909 A1 | 9/2009 | Hiti et al. |
| 2014/0118867 A1 | 5/2014 | Becerra et al. |
| 2014/0254217 A1 | 9/2014 | Li et al. |
| 2015/0357946 A1 | 12/2015 | Farr et al. |

\* cited by examiner

REDUCED MOTOR MAGNETIC LOSSES VIA REDUCTION OF TEMPORAL HARMONICS BY CONTROL OF DC LINK VOLTAGE

TECHNOLOGICAL FIELD

The present disclosure relates generally to an improved device and method for controlling an electric motor that allows for a reduction in the temporal harmonics of the system.

BACKGROUND

A power converter is a device for converting electrical power. One type of power converter converts direct current (DC) power to alternating current (AC) power. DC/AC converters are commonly referred to as "inverters." The AC/DC converter is another type. AC/DC converters, commonly referred to as "rectifiers" convert AC power into DC power. AC/AC converters (e.g., variable-frequency drivers) convert AC power in one form into AC power in another form.

These various converters are often used as part of the controls for an electric motor. For example, variable-frequency drivers, which may include a DC link electrically connected between a rectifier and an inverter, convert constant-frequency (e.g., 60 Hertz) AC power into variable-frequency AC power for industrial electric motors. Existing systems, however, suffer from various draw backs. These systems, for example, often experience significant losses due to magnetic factors (e.g., eddy current and hysteresis losses) when driving high speed/low inductance motors. The primary driver of these losses vary, but may include harmonic content in the current and flux waveforms.

BRIEF SUMMARY

An apparatus and method is disclosed for reducing motor magnetic losses via reduction of temporal harmonics by control of DC link voltage. In one embodiment, the apparatus includes an inverter for converting DC power into AC power for an electric motor. The apparatus also includes a voltage source, which may take form in a rectifier that is configured to provide the DC output voltage to the inverter via a DC link. The voltage source is configured to adjust a magnitude of the DC output voltage based on a rotational speed and a duty cycle. The voltage source may also adjust the magnitude of the DC output voltage based on a power output of the inverter.

The present disclosure thus includes, without limitation, the following example embodiments. Some example implementations provide an apparatus comprising: an inverter for converting direct current (DC) power into alternating current (AC) power for an electric motor; a voltage source configured to provide the DC output voltage to the inverter; wherein the voltage source is configured to adjust a magnitude of the DC output voltage based on a rotational speed of the electric motor.

Other example implementations provide a variable-frequency drive (VFD) controller comprising: a rectifier for converting an alternating current (AC) input voltage into a direct current (DC) output voltage; an inverter electrically coupled to the rectifier through a DC link, wherein the inverter is configured to convert DC power into AC power for an electric motor; a controller configured to receive a signal representing the rotational speed of the electric motor; wherein the controller is configured to control the rectifier based on the rotational speed signal.

Still other implementations provide a method of controlling a direct current (DC) voltage provided to an inverter that converts DC power into AC power for an electric motor, the method comprising: a resolver or sensor-less speed estimation that represents rotational speed of the motor; a microcontroller receiving and processing the rotational speed to generate a control signal; a rectifier adjusting a magnitude of the DC voltage based on the control signal These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed disclosure, in any of its various aspects and embodiments, should be viewed as intended to be combinable unless the context clearly dictates otherwise.

BRIEF DESCRIPTION OF THE DRAWINGS

For a detailed description of various exemplary embodiments, reference will now be made to the accompanying drawings in which.

The use of the same reference symbols in different figures indicates similar or identical items.

DETAILED DESCRIPTION

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. Further, when used herein (including in the claims), the words "about," "generally," "substantially," "approximately," and the like mean within a range of plus or minus 10% unless otherwise stated herein.

Variable-frequency drivers include a DC link electrically connected between a rectifier and an inverter. The present disclosure relates to variable-frequency drivers for controlling electric motors. More particularly, the present disclosure describes an apparatus or method for reducing the DC link voltage in a variable-frequency driver in order to reduce magnetic losses in electric motors.

An electric motor is a machine that converts electrical energy into mechanical energy. Electric motors are used in electric vehicles (EVs), electric airplanes, industrial machines, etc. In industrial machines, electric motors drive fans, pumps, compressors, etc. While the present disclosure can find wide application, the present disclosure will be described with reference to electric motors used in industrial machines, it being understood the present disclosure should not be limited thereto.

Industrial electric motors (hereinafter motors) vary in design. For example, motors can be asynchronous (e.g., induction motors) or synchronous (e.g., permanent magnet synchronous motors). Motors can have multiple phases. The present disclosure will be described with reference to three-phase permanent magnet synchronous motors, it being understood the present disclosure should not be limited thereto.

Three-phase permanent magnet synchronous motors have a rotor and a stator. The stator is cylindrically shaped with several coils or wire windings positioned around its periphery. The stator windings are supplied with AC current and produce a rotating magnetic field. The rotor is concentrically positioned and rotatable inside the stator. The rotor is connected to a drive shaft. An interaction between the rotating magnetic field and the rotor produces torque for driving the shaft, which turns a fan, pump, compressor, etc.

Variable-frequency drives are typically used for controlling industrial motors. Variable-frequency drives control motor speed and torque by varying the magnitude and/or frequency of the AC current provided to the motor. Variable-frequency drives typically consist of three distinct subsystems: a rectifier (i.e., an AC/DC converter); a DC link, and an inverter (i.e., a DC/AC converter). A rectifier is a device that converts AC power into DC power. A DC link electrically connects the rectifier to the inverter. The DC link typically includes of one or more capacitors, which smooths DC voltage ripple, which can create problems. For example, high DC ripple current can damage power semiconductors of the inverter, which converts DC power into AC power for the motor.

Figure 1:
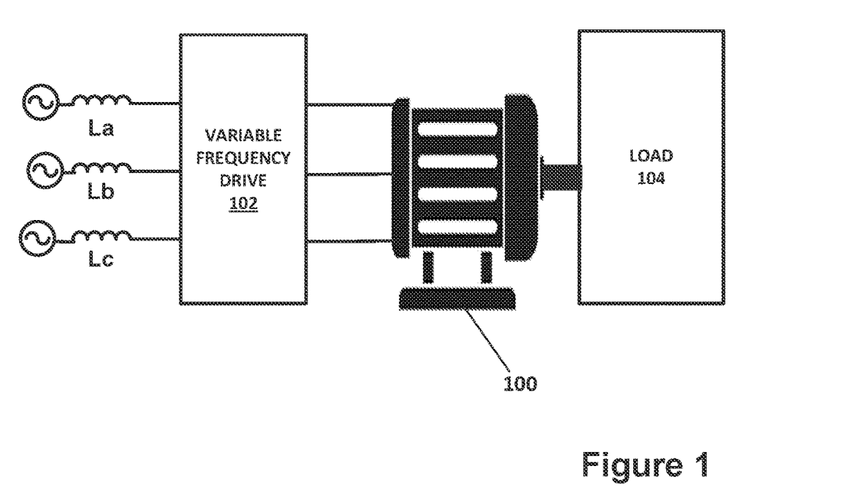
FIG. 1 illustrates an electric motor that is driven by a variable-frequency drive.

FIG. 1 is a diagram illustrating a three-phase induction motor 100 controlled by a variable-frequency drive 102. The motor is mechanically connected to and configured to provide rotational torque to a shaft that drives load 104, which may take form in a fan, pump, compressor, etc. Variable-frequency drive 100 is electrically coupled to receive three-phase AC power from an electrical power grid via inductors La-Lc. The AC power received from the electrical grid should be constant in frequency (e.g., 60 Hertz).

Figure 2:
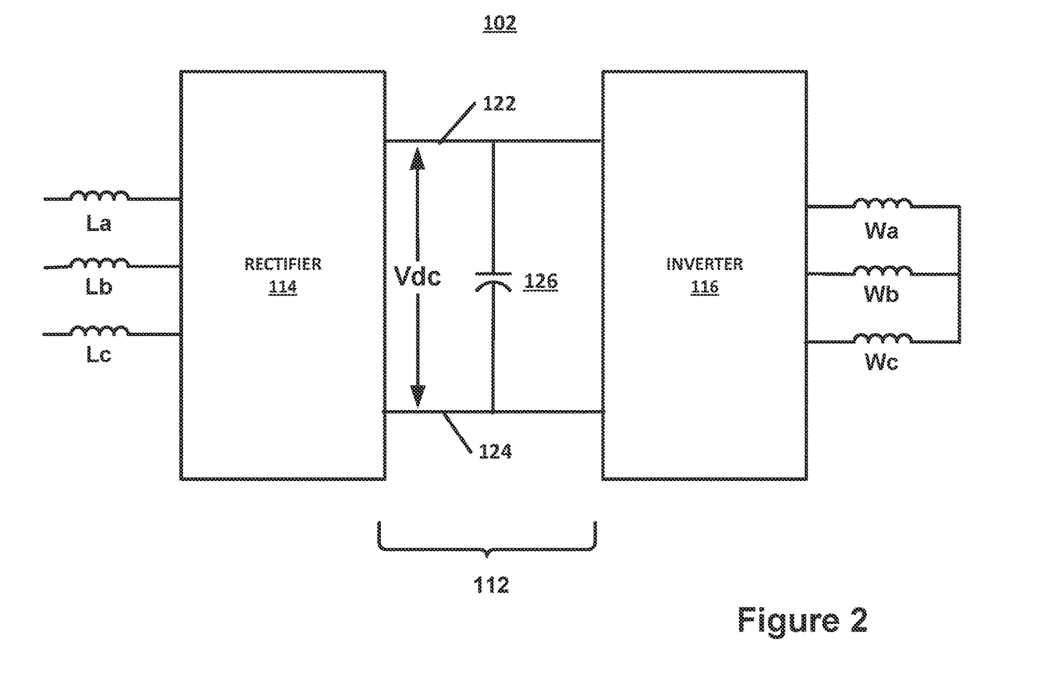
FIG. 2 is a block diagram illustrating the variable-frequency drive of FIG. 1.

FIG. 2 illustrates one embodiment of variable-frequency drive 102. As seen, variable-frequency drive 102 includes a DC link 112 electrically connected between a three-phase rectifier 114 and a three-phase inverter 116. Rectifier 114 is electrically connected to and configured to receive three-phase AC power via conductors La-Lc. Rectifier 114 converts the three-phase AC power into DC output voltage Vdc. DC link 112 includes positive and negative bus bars 122 and 124, respectively, between which one or more capacitors 126 are connected. The one or more capacitors 126 filter out ripples of DC output voltage Vdc. Three-phase inverter 116 converts Vdc into three-phase AC power that is provided to windings Wa-Wc of motor 100's stator.

Figure 3:
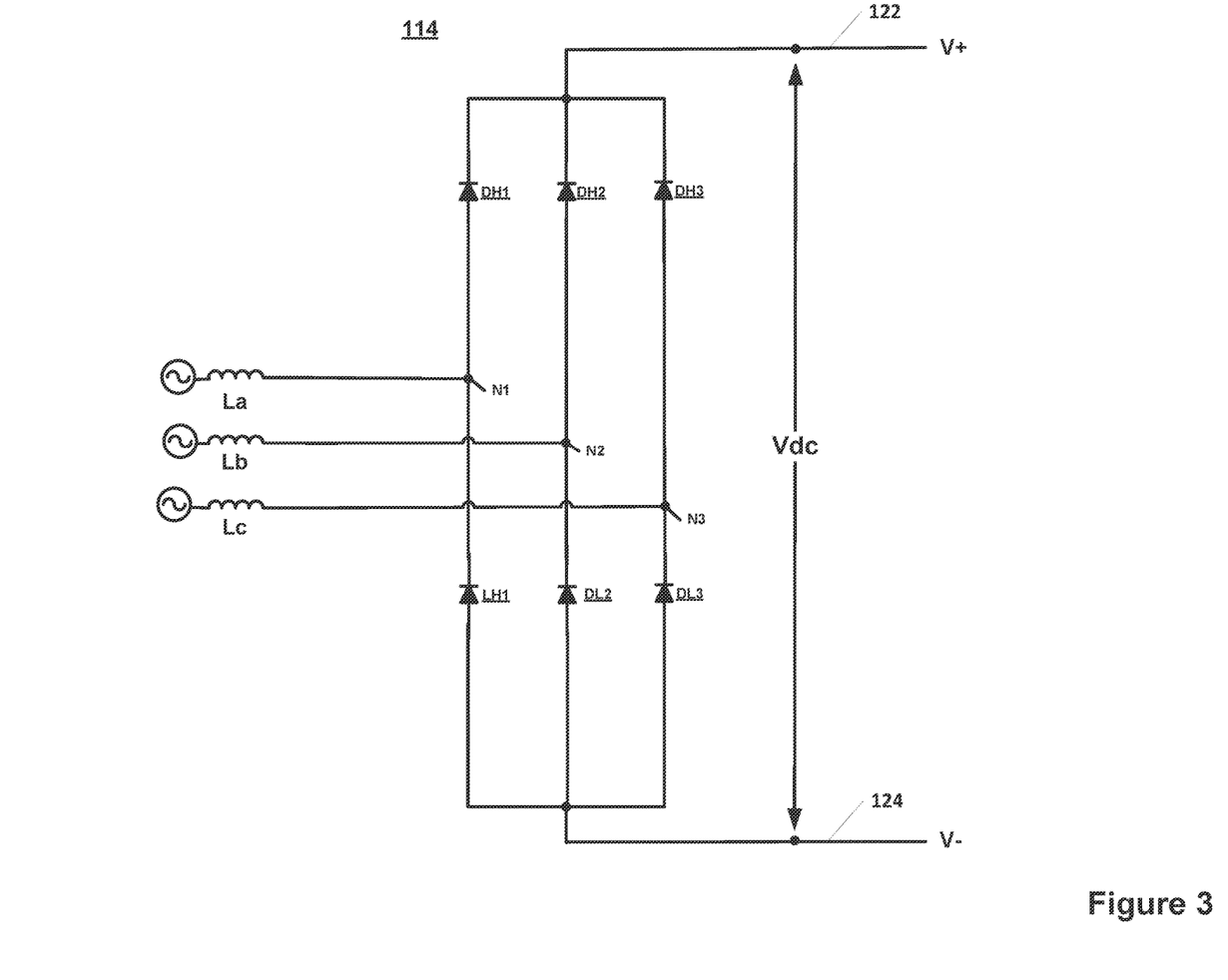
FIG. 3 is a schematic diagram of the passive rectifier employed in the variable-frequency drive of FIG. 2.

FIG. 3 illustrates relevant components of three-phase rectifier 114, which converts three-phase AC input provided by the power grid to DC voltage output Vdc. Although not shown, a rectifier may include an electronic filter to smooth the output. Each phase of rectifier 114 includes a high-side diode DHx connected in series with low-side diode DLx, respectively, via node Nx. Nodes N1-N3 are connected to respective terminals of inductive elements La-Lc. Rectifier 114 is passive; its output voltage Vdc cannot be adjusted, assuming constant three-phase input AC power.

Figure 4:
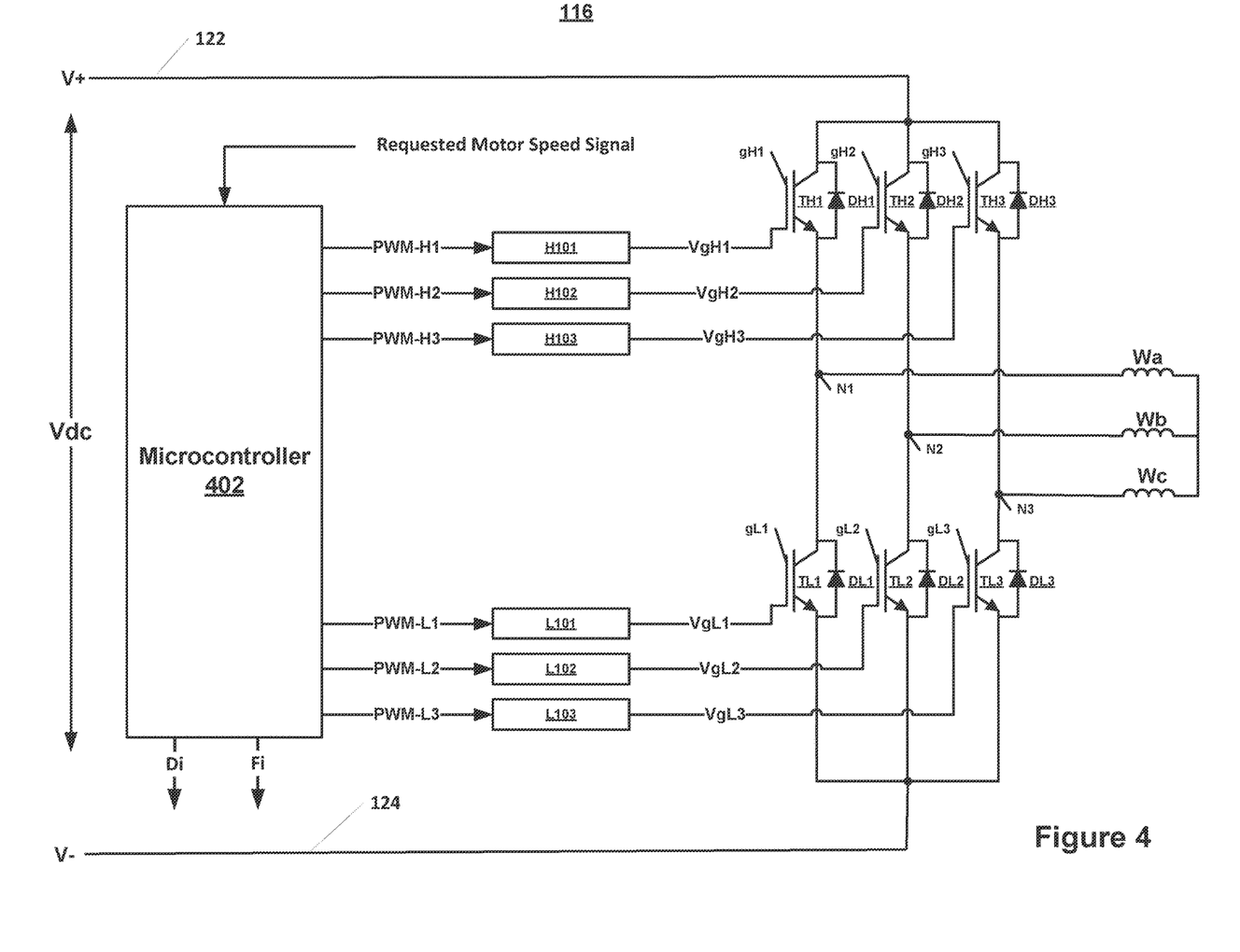
FIG. 4 is a schematic diagram of an example inverter.

FIG. 4 illustrates an example three-phase inverter 116, it being understood that the term inverter should not limited to that shown. Each phase includes a high-side switch connected to a low-side switch. Each high-side switch includes an insulated-gate bipolar transistor (IGBT) THx connected in parallel with diode DHx, and each low-side switch includes an IGBT TLx connected in parallel with diode DLx. It should be noted that switches should not be limited to parallel combination of IGBTs and diodes. Switches may take many different forms. For example, the switches may take form in MOSFETs, etc. Moreover, each switch may include multiple switches (e.g., IGBTs) that are coupled in parallel in alternative embodiments.

High-side IGBTs TH1-TH3 are connected in series with low-side IGBTs TL1-TL3, respectively, via nodes N1-N3, respectively, which in turn are connected to respective terminals of stator windings Wa-Wc.

The collectors of TH1-TH3 and the cathodes of DH1-DH3 are connected together and to V+ bus bar 122, while the emitters of TL1-TL3 and the anodes of diodes DL1-DL3 are connected together and to V− bus bar 124. Vdc is received by rectifier 114 via V+ and V− bus bars 122 and 124.

High-side IGBTs TH1-TH3 and low-side IGBTs TL1-TL3 are controlled by microcontroller 402 through gate drivers H101-H103 and L101-L103, respectively, based on one or more input signals (e.g., requested motor speed) set by an operator. A gate driver is a circuit that accepts a low-power input signal from a device (e.g., a microcontroller) and produces a corresponding high-current output signal that controls the gate of a transistor.

Control of the IGBTs is relatively simple. High-side gate drivers H101-H103 and low-side gate drivers L101-L103 receive low-power, driver control signals (e.g., pulse width modulation signals PWM-H1-PWM-H3 and PWM-L1-PWM-L3) from microcontroller 402. High-side gate drivers H101-H103 activate high-side IGBTs TH1-TH3, respectively, by asserting high-current, gate control signals VgH1-VgH3, respectively, when PWM-H1-PWM-H3 signals, respectively, are asserted. Low-side gate drivers L101-L103 activate low-side IGBTs TL1-TL3, respectively, by asserting high-current, gate control signals VgL1-VgL3, respectively, when PWM-L1-PWM-L3 signals, respectively, are asserted. Each of the transistors TH1-TH3 and TL1-TL3 conducts current to or from a connected stator winding W when activated.

Figure 5:
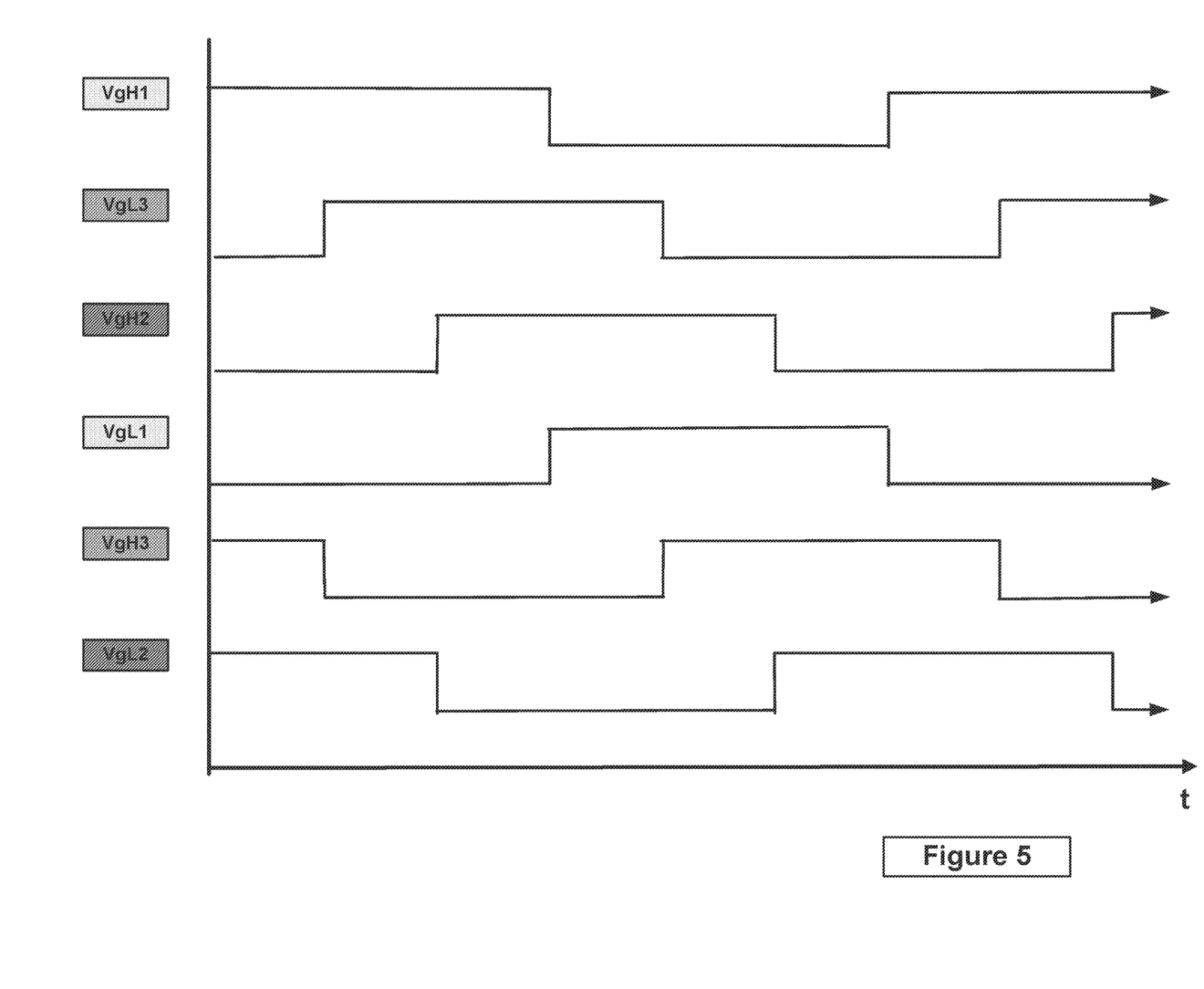
FIG. 5 is a timing diagram illustrating operational aspects of the inverter shown in FIG. 4.

Through coordinated activation of high-side and low-side IGBTs, the direction of current flow in stator windings can be continuously and regularly switched; current travels into a winding W, stops, and then reverses and flows out. FIG. 5 illustrates an example timing diagram for gate control signals VgH1-VgH3 and VgL1-VgL3. This timing diagram is provided only to facilitate a basic understanding of inverter 116 operation. In practice, more complicated timing patterns are used to control high-side IGBTs TH1-TH3 and low-side IGBTs TL1-TL3. A rotating magnetic field can be created by coordinating current flow through stator windings Wa-Wc. An interaction between the rotating magnetic field and motor 100's rotor (not shown) creates a rotational force that drives a shaft that turns, for example, an industrial pump.

Microcontroller 402 controls high-side IGBTs TH1-TH3 and low-side IGBTs TL1-TL3 via PWM-H1-PWM-H3 and PWM-L1-PWM-L3 signals, respectively. Microcontrollers, such as microcontroller 402, and other similar data processing devices may include a central processing unit (CPU), memory that stores instructions executable by the CPU, and peripherals such as timers, input/output (I/O) ports, etc. Microcontroller 402 generates the PWM-H1-PWM-H3 and PWM-L1-PWM-L3 signals based on CPU executable instructions stored in memory. Gate drivers H101-H103 generate the VgH1-VgH3 signals based on the PWM-H1-PWM-H3 signals, and gate drivers L101-L103 generate the VgL1-VgL3 signals based on the PWM-L1-PWM-L3 signals. Microcontroller 402 can adjust the duty cycle Di and/or frequency Fi of the PWM signals. For example, if the requested motor speed signal changes, the frequency Fi changes accordingly; if the requested motor speed signal increases, Fi increases, which causes motor speed to increase. The duty cycle Di relates to the power provided to motor 100; power increases with Di, and vice-versa. Thus, if motor 100 needs more power to drive load 104 at the requested motor speed, duty cycle Di increases, and vice-versa.

The PWM signals activate and deactivate high-side IGBTs TH1-TH3 and low-side IGBTs TL1-TL3, which unfortunately creates harmonics in motor 100. A harmonic of a magnetic flux, voltage or current is a sinusoidal wave whose frequency is an integer multiple of the fundamental frequency such as the frequency of the PWM signals generated by microcontroller 402. Harmonics are a frequent cause of problems for motors. For example, harmonics can cause motors to run hot or to run slower than normal, which in turn can degrade a motor's performance and reliability. Harmonics in the motor can be reduced by increasing the frequency of the PWM signals. Unfortunately, switching losses of high-side IGBTs TH1-TH3 and low-side IGBTs TL1-TL3 increase with an increase in the frequency of the PWM signals. Alternatively, a filter can be added to the output of inverter 116 to reduce the harmonics. These filters, however, are expensive and increase the cost and complexity of inverter 116.

The present disclosure describes a method and apparatus for reducing harmonics in motors without having to add an expensive filter or to increase inverter operational frequency.

Figure 10:
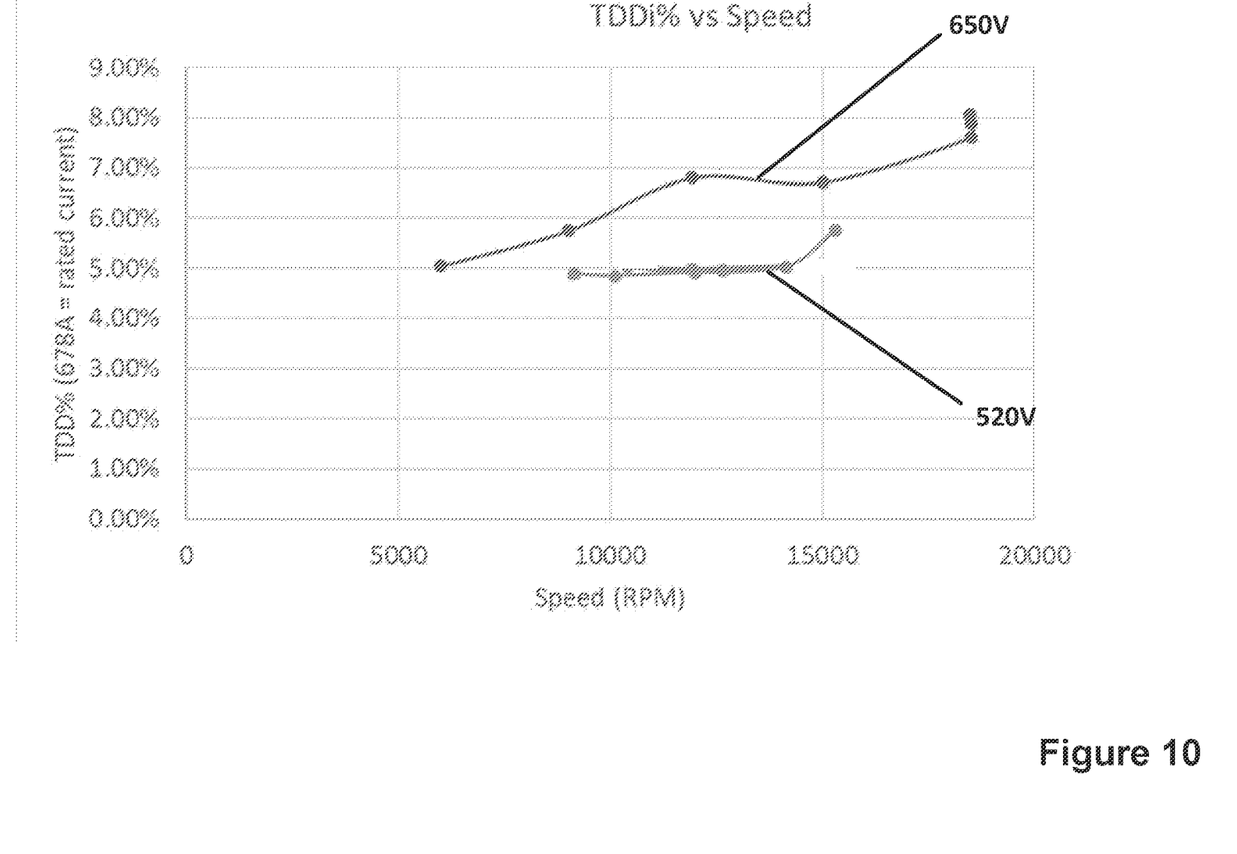
FIG. 10 illustrates a relationship between motor harmonics current THDi to DC voltage.

The inventors listed on this document have found that motor harmonics can be controlled by regulating the magnitude of the DC output voltage Vdc provided to inverter 116. FIG. 10 illustrates a relationship between motor harmonics current TDDi to DC output voltage. Specifically, FIG. 10 shows that the harmonics current (e.g., TDDI) decreases when, for example, the DC output voltage Vdc decreases from 650V to 520V while the motor is operating in the 10000-15000 RPM speed range.

Figure 6:
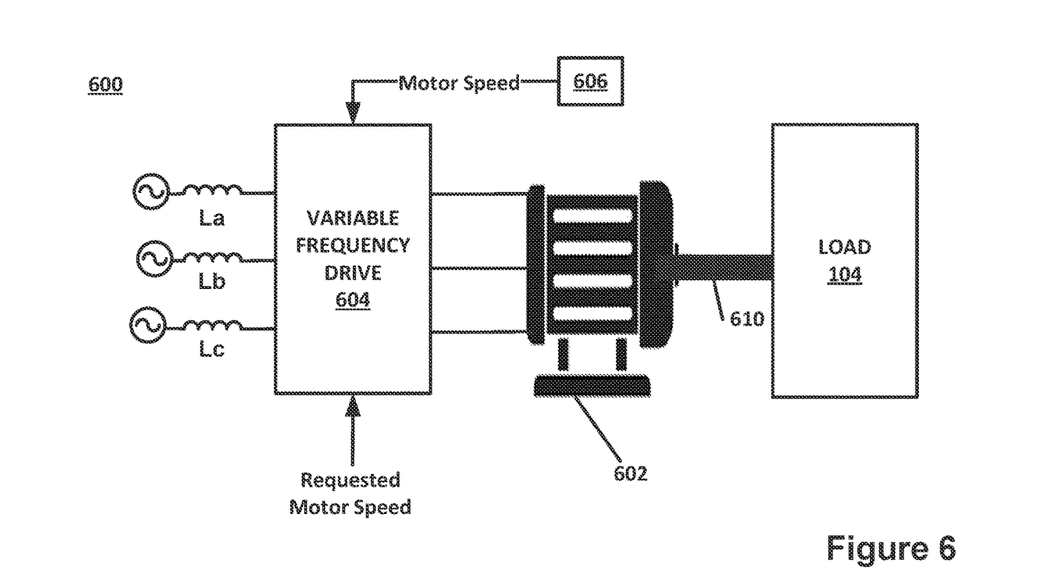
FIG. 6 illustrates electric motor that is driven by a variable-frequency drive according to an example embodiment of the present disclosure.

FIG. 6 is a diagram illustrating a system 600 employing one embodiment of the present disclosure. System 600 includes a motor 602 controlled by a variable-frequency drive 604. The harmonics of motor 602 can be regulated based on the speed at which motor 602 operates as will be more fully described below.

Motor 602 is mechanically connected to and configured to provide rotational torque to load 104 via shaft 610. Variable-frequency drive 604 is electrically coupled to receive three-phase AC power from an electrical power grid via inductors La-Lc. The AC power received from the electrical grid should be constant in frequency.

Motor 602 is substantially similar to motor 100 shown in FIG. 1. One difference exists between the two. Provided is a rotational speed device 606 such as resolver, RPM sensor, or sensor-less speed estimation algorithm for measuring the rotational speed of the motor's shaft 610. The output of rotational speed device 606 (i.e., "motor speed"), which can be an analog or digital signal, is provided as an input to variable-frequency driver 604.

Variable-frequency driver 604 can regulate the harmonics of motor 602 based on the motor speed signal received from device 606. Variable-frequency driver 604 also receives a requested motor speed signal set by an operator. In an alternative embodiment, variable-frequency driver 604 can use the requested motor signal to regulate motor harmonics.

Figure 7:
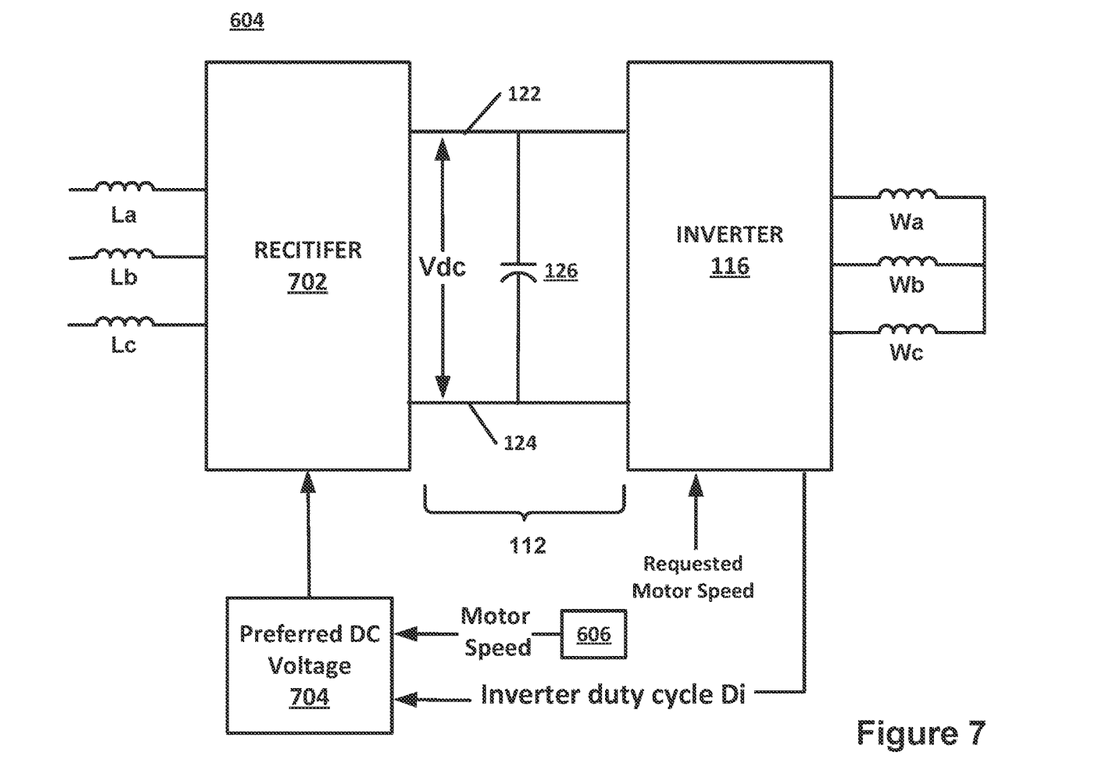
FIG. 7 is a block diagram illustrating one embodiment of the variable-frequency drive of Figure, according to an example embodiment of the present disclosure 6.

FIG. 7 illustrates one embodiment of variable-frequency drive 604, it being understood the present disclosure should not be limited thereto. As seen, variable-frequency drive 604 includes DC link 112 electrically connected between a three-phase rectifier 702 and three-phase inverter 116. Rectifier 702 (also known as a synchronous rectifier) is electrically connected to and configured to receive three-phase AC power via conductors La-Lc. Rectifier 702 converts the three-phase AC power into DC output voltage Vdc. Three-phase inverter 116 converts Vdc into three-phase AC power that is provided to windings Wa-We of motor 100's stator.

Figure 8:
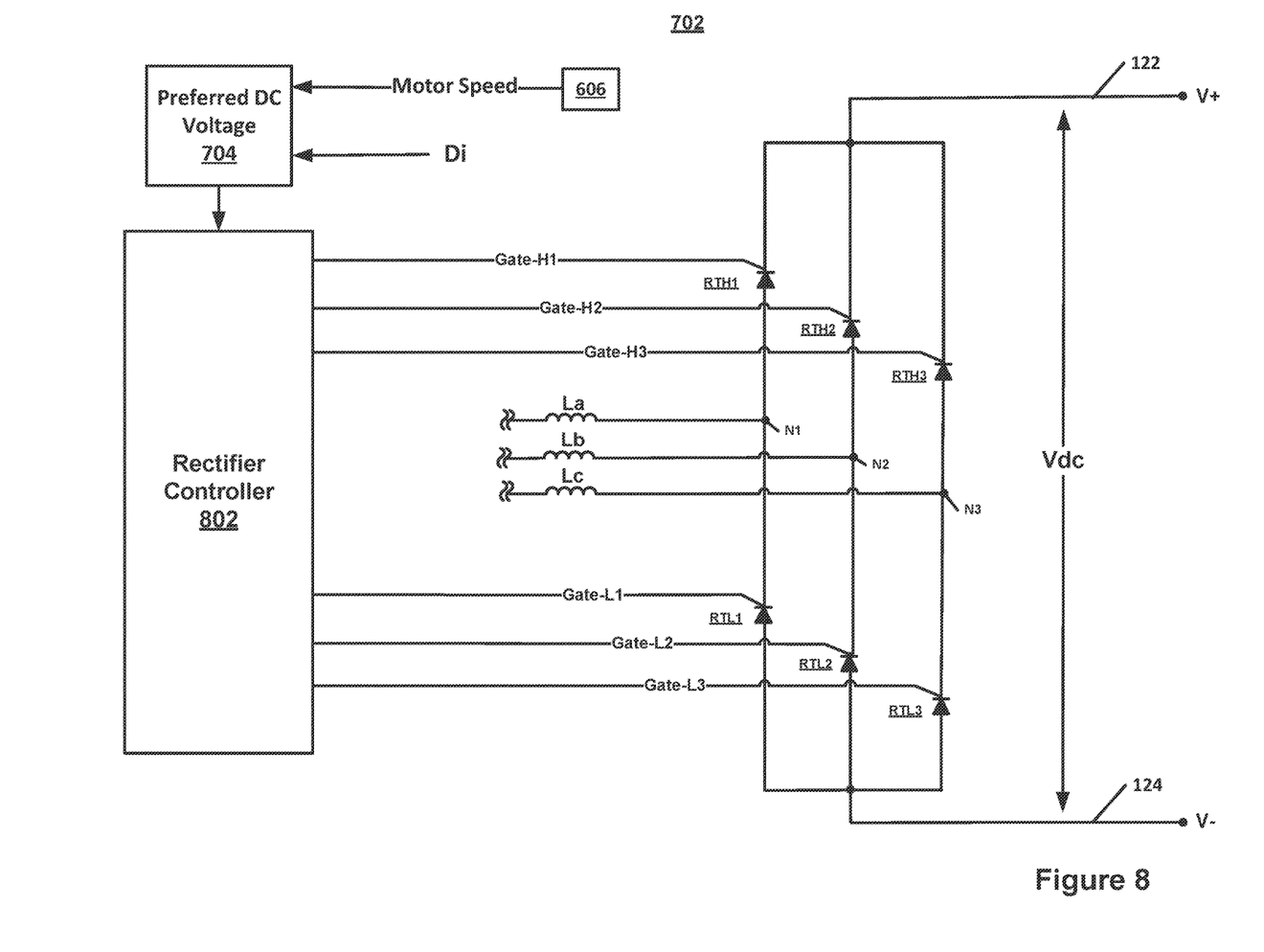
FIG. 8 is a schematic diagram illustrating one embodiment of the rectifier employed in the variable-frequency drive of FIG. 7, according to an example embodiment of the present disclosure.

FIG. 8 illustrates relevant components of an example three-phase rectifier 702 according to one embodiment of the present disclosure. With continuing reference to FIGS. 4 and 8, inverter 116 and rectifier 702 are similar in some aspects. Like inverter 116, each phase of rectifier 702 includes a high-side switch connected to a low-side switch. Each high-side switch includes thyristor RTHx, and each low-side switch includes a thyristor RTLx. High-side thyristors RTH1-RTH3 are connected in series with low-side thyristors RTL1-RTL3, respectively, via nodes N1-N3, respectively, which in turn are connected to respective terminals of inductive elements La-Lc, respectively. The thyristors RTH1-RTH3 are connected together and to V+ bus bar 122 as shown, while thyristors RTL1-RTL3 are connected together and to V− bus bar 124 as shown.

High-side thyristors RTH1-RTH3 and low-side thyristors RTL1-RTL3 are controlled by rectifier controller 802. Through coordinated activation of high-side and low-side thyristors, rectifier 702 provides a rectified, DC output voltage Vdc at output terminals V+ and V−, which in turn can be connected to inverter 116 via DC link 112.

While inverter 116 and rectifier 702 are similar, differences exists. Rectifier 702 includes controller 802, which may include a phase-lock loop (PLL) and other components for synchronizing the control of thyristors RTH1-RTH3 and thyristors RTL1-RTL3 to the frequency (e.g., 60 Hertz) of the three-phase AC input voltage. Controller 802 may also include a CPU and a memory that stores CPU executable instructions that can be substantially different from the CPU executable instructions stored in memory of microcontroller 302 of inverter 116. These instructions, when executed, can control the harmonics of motor 602 based on the motor load, and the motor speed as provided by device 606, the requested motor speed provided by a machine operator, or PWM frequency Fi from inverter 116 as will be more fully described below.

Controller 802 generates control signals Gate-H1-Gate-H3 and Gate-L1-Gate-L3 that control thyristors RTH1-RTH3 and thyristors RTL1-RTL3. The magnitude of DC output voltage Vdc depends on the duty cycle Dr of the Gate signals generated by controller 802.

A preferred DC voltage control logic circuit 704 receives the motor speed signal from rotational speed device 606, which represents the speed (e.g., RPMs) of motor 602, and the inverter duty cycle Di. Preferred DC voltage control logic circuit 704 generates a preferred DC voltage based on the two input values. Controller 802 can adjust the duty cycle Dr of the Gate signals provided to high-side thyristors RTH1-RTH3 and low-side thyristors RTL1-RTL3 based on preferred DC voltage. For example, controller 802 can decrease Dr, which in turn reduces Vdc, which in turn reduces harmonics in motor 602. In an alternative embodiment, instead of the motor speed from device 606, preferred DC voltage control logic circuit 704 may receive the same operator requested motor speed signal that is received by inverter 115, or preferred DC voltage control logic circuit 704 may receive the frequency Fi of the PWM signals that inverter 116 generates to control its switches. In this alternative embodiment, controller 802 can adjust the duty cycle Dr based on the preferred DC voltage calculated by preferred DC voltage control logic circuit 704 based on.

Figure 9:
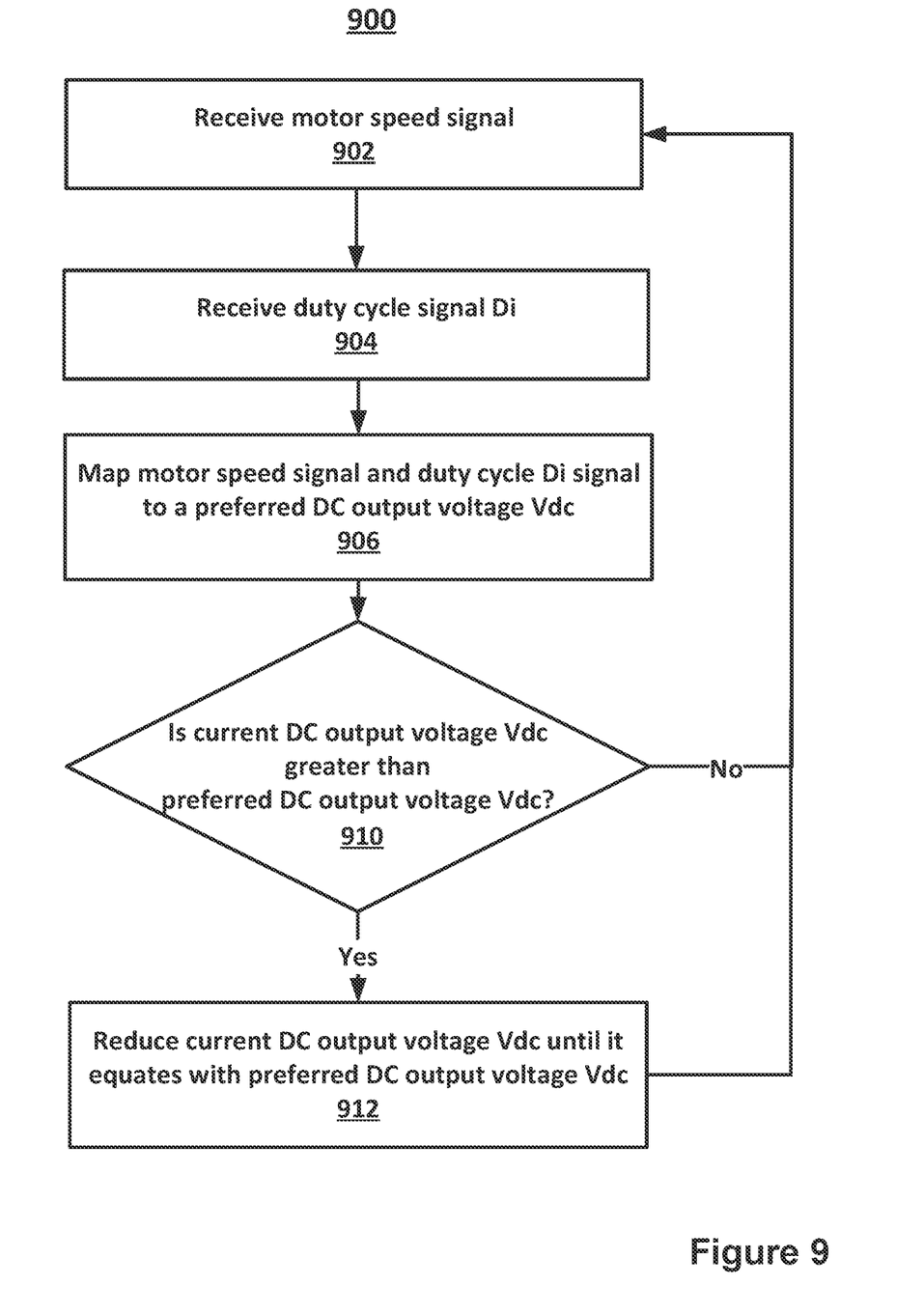
FIG. 9 is a flowchart illustrating high-level operational aspects of a method employed by the rectifier controller shown in Figure, according to an example embodiment of the present disclosure 8.

FIG. 9 illustrates a method 900 implemented by controller 802 for adjusting the DC output voltage Vdc based on the motor speed signal in accordance with one embodiment of the present disclosure. Method 900 is implemented as a loop to continuously calibrate rectifier 702 and optimize electric motor 602. The process starts with steps 902 and 904 in which the preferred DC voltage control logic circuit 704 receives the motor speed signal from the sensor 604 and the duty cycle Di from microcontroller 402 of inverter 116. These two values can be mapped to preferred DC output voltage Vdc, respectively. In step 910 the preferred DC output voltage Vdc is compared by rectifier controller 802 against the current DC output Vdc of rectifier 702. If the current DC output voltage Vdc exceeds the preferred DC output voltage Vdc, then controller 802 reduces duty cycle Dr until the current DC output voltage Vdc equates to the preferred DC output voltage Vdc as shown in step 912. If the current DC output voltage Vdc is not greater than the preferred DC output voltage Vdc in step 910, or in response to reducing the current DC output voltage Vdc until it equals the preferred DC output voltage Vdc in step 912, the process repeats beginning with step 902 as shown in the figure.

As explained above and reiterated below, the present disclosure includes, without limitation, the following example implementations.

Clause 1. An apparatus comprising: an inverter for converting direct current (DC) power into alternating current (AC) power for an electric motor; a voltage source configured to provide the DC output voltage to the inverter; wherein the voltage source is configured to adjust a magnitude of the DC output voltage based on a rotational speed of the electric motor.

Clause 2. The apparatus of the preceding clause wherein the voltage source comprises: a rectifier for converting an AC input voltage into the DC output voltage; a controller configured to receive a signal representing the rotational speed of the electric motor; wherein the controller is configured to control the rectifier based on the rotational speed signal.

Clause 3. The apparatus of any of the preceding clauses wherein the rectifier comprises: output terminals that provide the DC output voltage; a first phase comprising a first high-side switch and a first low side switch, wherein the first high-side switch and the first low-side switch are connected in series between the output terminals; wherein the controller is configured generate a first control signal for controlling the first high-side switch or the first low-side switch based on the rotational speed signal.

Clause 4. The apparatus of any of the preceding clauses wherein the first control signal varies with a variation of the rotational speed signal.

Clause 5. The apparatus of any of the preceding clauses wherein the controller comprises: a central processing unit (CPU); a memory for storing instructions that are executable by the CPU; an analog-to-digital converter for converting the signal into a digital signal for subsequent processing by the CPU in accordance with instructions stored in memory; wherein the first control signal is generated in response to the CPU processing the digital signal.

Clause 6. The apparatus of any of the preceding clauses wherein the first control signal comprises a first pulse-width modulation (PWM) signal with a duty cycle that varies based on the rotational speed signal.

Clause 7. The apparatus of any of the preceding clauses wherein the first high-side switch comprises a first thyristor, a first metal-oxide field effect transistor (MOSFET) or an insulated-gate bipolar transistor (IGBT).

Clause 8. The apparatus of any of the preceding clauses wherein the rectifier comprises: a second phase comprising a second high-side switch and a second-low side switch, wherein the second high-side switch and the second low-side switch are connected in series between the output terminals; a third phase comprising a third high-side switch and a third low-side switch, wherein the third high-side switch and the third low-side switch are connected in series between the output terminals; wherein the controller is configured to generate a second control signal for controlling the second high-side switch or the second low-side switch based on the rotational speed signal; wherein the controller is configured to generate a third control signal for controlling a third high-side switch or a third low-side switch based on the rotational speed signal.

Clause 9. The apparatus of any of the preceding clauses wherein the voltage source comprises: a DC/DC converter for converting a DC input voltage to the DC output voltage; a controller configured to receive a signal representing the rotational speed of the electric motor; wherein the controller is configured to control the DC/DC converter based on the rotational speed signal.

Clause 10. The apparatus of any of the preceding clauses wherein the DC/DC converter comprises: input terminals configured to receive the DC input voltage; output terminals to provide the DC output voltage; a switch connected between the input and output terminals; wherein the controller is configured generate a control signal for controlling the switch based on the rotational speed signal.

Clause 11. The apparatus of any of the preceding clauses wherein the control signal varies with a variation of the rotational speed signal and duty cycle.

Clause 12. The apparatus of any of the preceding clauses wherein the controller comprises: a central processing unit (CPU); a memory for storing instructions that are executable by the CPU; an analog-to-digital converter for converting the signal into a digital signal for subsequent processing by the CPU in accordance with instructions stored in memory; wherein the control signal is generated in response to the CPU processing the digital signal.

Clause 13. The apparatus of any of the preceding clauses wherein the control signal comprises a first pulse-width modulation (PWM) signal with a duty cycle that varies based on the rotational speed signal.

Clause 14. A variable-frequency drive (VFD) controller comprising: a rectifier for converting an alternating current (AC) input voltage into a direct current (DC) output voltage; an inverter electrically coupled to the rectifier through a DC link, wherein the inverter is configured to convert DC power into AC power for an electric motor; a controller configured to receive a signal representing the rotational speed of the electric motor; wherein the controller is configured to control the rectifier based on the rotational speed signal.

Clause 15. The VFD of the preceding clause wherein the DC link comprises: a pair of bus bars coupled to a pair of output terminals, respectively, of the rectifier; one or more capacitors coupled between the bus bars.

Clause 16. The VFD of any of the preceding clauses wherein the rectifier comprises: a rectifier, which in turn comprises: output terminals that provide the DC output voltage; a first phase comprising a first high-side switch and a first low side switch, wherein the first high-side switch and the first low-side switch are connected in series between the output terminals; a second phase comprising a second high-side switch and a second-low side switch, wherein the second high-side switch and the second low-side switch are connected in series between the output terminals; a third phase comprising a third high-side switch and a third low-side switch, wherein the third high-side switch and the third low-side switch are connected in series between the output terminals; wherein the controller is configured to generate a first control signal for controlling a gate of the first high-side switch or a gate of the first low-side switch based on the rotational speed signal; wherein the controller is configured to generate a second control signal for controlling a gate of second high-side switch or a gate of the second low-side switch based on the rotational speed signal; wherein the controller is configured to generate a third control signal for controlling a gate of third high-side switch or a gate of the third low-side switch based on the rotational speed signal.

Clause 17. The VFD of any of the preceding clauses wherein the controller comprises: a central processing unit (CPU); a memory for storing instructions that are executable by the CPU; an analog-to-digital converter for converting the rotational speed signal into a digital signal for subsequent processing by the CPU in accordance with instructions stored in memory; wherein the first, second and third control signals are generated in response to the CPU processing the digital signal.

Clause 18. The VFD of any of the preceding clauses wherein the first, second, and third control signals comprise first, second, and third pulse-width modulation (PWM) signals, respectively, comprising first, second, and third duty cycles, respectively, that vary based on the rotational speed signal.

Clause 19. A method of controlling a direct current (DC) voltage provided to an inverter that converts DC power into AC power for an electric motor, the method comprising: a resolver or sensor-less speed estimation algorithm generating a signal that represents a rotational speed of the motor; a microcontroller receiving and processing the rotational speed signal to generate a control signal; a rectifier adjusting a magnitude of the DC voltage based on the control signal.

Clause 20. The method of the preceding clause wherein the magnitude of the DC voltage is reduced in response to a reduction in the rotational speed of the motor.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An apparatus comprising:
    an inverter for converting direct current (DC) power into alternating current (AC) power for an electric motor;
    a voltage source configured to provide DC output voltage to the inverter;
    wherein the voltage source is configured to adjust a magnitude of the DC output voltage based on a rotational speed of the electric motor.

2. The apparatus of claim 1 wherein the voltage source comprises:
    a rectifier for converting an AC input voltage into the DC output voltage;
    a controller configured to receive a signal representing the rotational speed of the electric motor;
    wherein the controller is configured to control the rectifier based on the rotational speed signal and an inverter duty cycle Di.

3. The apparatus of claim 2 wherein the
    rectifier comprises: output terminals that
    provide the DC output voltage;
    a first phase comprising a first high-side switch and a first-low side switch, wherein the first high-side switch and the first low-side switch are connected in series between the output terminals;
    wherein the controller is configured generate a first control signal for controlling the first high-side switch or the first low-side switch based on the rotational speed signal.

4. The apparatus of claim 3 wherein the first control signal varies with a variation of the rotational speed signal.

5. The apparatus of claim 4 wherein the controller comprises:
    a central processing unit (CPU);
    a memory for storing instructions that are executable by the CPU;

an analog-to-digital converter for converting the signal into a digital signal for subsequent processing by the CPU in accordance with instructions stored in memory;

wherein the first control signal is generated in response to the CPU processing the digital signal.

6. The apparatus of claim 5 wherein the first control signal comprises a first pulse-width modulation (PWM) signal with a duty cycle that varies based on the rotational speed signal.

7. The apparatus of claim 5 wherein the first high-side switch comprises a first thyristor, a first metal-oxide field effect transistor (MOSFET) or an insulated-gate bipolar transistor (IGBT).

8. The apparatus of claim 7 wherein the rectifier comprises:
   a second phase comprising a second high-side switch and a second-low side switch, wherein the second high-side switch and the second low-side switch are connected in series between the output terminals;
   a third phase comprising a third high-side switch and a third low-side switch, wherein the third high-side switch and the third low-side switch are connected in series between the output terminals;
   wherein the controller is configured to generate a second control signal for controlling the second high-side switch or the second low-side switch based on the rotational speed signal;
   wherein the controller is configured to generate a third control signal for controlling the third high-side switch or the third low-side switch based on the rotational speed signal.

9. The apparatus of claim 1 wherein the voltage source comprises:
   a DC/DC converter for converting a DC input voltage to the DC output voltage;
   a controller configured to receive a signal representing the rotational speed of the electric motor;
   wherein the controller is configured to control the DC/DC converter based on the rotational speed signal.

10. The apparatus of claim 9 wherein the DC/DC converter comprises: input terminals configured to receive the DC input voltage;
    output terminals to provide the DC output voltage;
    a switch connected between the input and output terminals;
    wherein the controller is configured generate a control signal for controlling the switch based on the rotational speed signal and inverter duty cycle Di.

11. The apparatus of claim 10 wherein the control signal varies with a variation of the rotational speed signal.

12. The apparatus of claim 11 wherein the
    controller comprises: a central processing unit (CPU);
    a memory for storing instructions that are executable by the CPU;
    an analog-to-digital converter for converting the signal into a digital signal for subsequent processing by the CPU in accordance with instructions stored in memory;
    wherein the control signal is generated in response to the CPU processing the digital signal.

13. The apparatus of claim 12 wherein the control signal comprises a first pulse-width modulation (PWM) signal with a duty cycle that varies based on the rotational speed signal.

14. A variable-frequency drive (VFD) controller comprising:
    a rectifier for converting an alternating current (AC) input voltage into a direct current (DC) output voltage;
    an inverter electrically coupled to the rectifier through a DC link, wherein the inverter is configured to convert DC power into AC power for an electric motor;
    a controller configured to receive a signal representing the rotational speed of the electric motor;
    wherein the controller is configured to control the rectifier based on the rotational speed signal, and
    wherein the DC link comprises a pair of bus bars coupled to a pair of output terminals, respectively, of the rectifier and one or more capacitors are coupled between the bus bars.

15. The VFD of claim 14 wherein the rectifier comprises:
    output terminals that provide the DC output voltage;
    a first phase comprising a first high-side switch and a first low-side switch, wherein the first high-side switch and the first low-side switch are connected in series between the output terminals;
    a second phase comprising a second high-side switch and a second-low side switch, wherein the second high-side switch and the second low-side switch are connected in series between the output terminals;
    a third phase comprising a third high-side switch and a third low-side switch, wherein the third high-side switch and the third low-side switch are connected in series between the output terminals;
    wherein the controller is configured to generate a first control signal for controlling the first high-side switch or the first low-side switch based on the rotational speed signal;
    wherein the controller is configured to generate a second control signal for controlling the second high-side switch the second low-side switch based on the rotational speed signal;
    wherein the controller is configured to generate a third control signal for controlling the third high-side switch or the third low-side switch based on the rotational speed signal.

16. The VFD of claim 15 wherein the controller comprises:
    a central processing unit (CPU);
    a memory for storing instructions that are executable by the CPU;
    an analog-to-digital converter for converting the rotational speed signal into a digital signal for subsequent processing by the CPU in accordance with instructions stored in memory;
    wherein the first, second and third control signals are generated in response to the CPU processing the digital signal.

17. The VFD of claim 16 wherein the first, second, and third control signals comprise first, second, and third pulse-width modulation (PWM) signals, respectively, comprising first, second, and third duty cycles, respectively, that vary based on the rotational speed signal.

18. A method of controlling a direct current (DC) voltage provided to an inverter that converts DC power into AC power for an electric motor, the method comprising:
    a device generating a signal that represents a rotational speed of the electric motor;
    a microcontroller receiving and processing the rotational speed signal to generate a control signal;
    a rectifier adjusting a magnitude of the DC voltage based on the control signal.

19. The method of claim 18 wherein the magnitude of the DC voltage is reduced in response to a reduction in the rotational speed of the electric motor.

* * * * *